(12) United States Patent
Lair

(10) Patent No.: US 6,845,607 B2
(45) Date of Patent: Jan. 25, 2005

(54) VARIABLE AREA PLUG NOZZLE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 201 days.

(21) Appl. No.: 10/338,528

(22) Filed: Jan. 8, 2003

(65) Prior Publication Data
US 2003/0150214 A1 Aug. 14, 2003

Related U.S. Application Data

(60) Provisional application No. 60/346,949, filed on Jan. 9, 2002.

(51) Int. Cl.[7] .................................................. F02K 3/12
(52) U.S. Cl. .............................. 60/263; 60/204; 60/771; 181/213
(58) Field of Search ......................... 60/204, 262, 263, 60/264, 771, 200.1, 226.1, 226.2, 226.3, 233, 239; 181/213, 215, 216, 220

(56) References Cited

U.S. PATENT DOCUMENTS

| 3,084,507 A | | 4/1963 | Kleinhaus et al. | |
|---|---|---|---|---|
| 3,390,837 A | | 7/1968 | Freeman | |
| 3,829,020 A | | 8/1974 | Stearns | |
| 3,910,375 A | * | 10/1975 | Hache et al. | 181/33 HC |
| 4,501,393 A | * | 2/1985 | Klees et al. | 239/265.13 |
| 4,537,026 A | * | 8/1985 | Nightingale | 60/264 |
| 5,184,459 A | * | 2/1993 | McAndrews | 60/226.3 |

* cited by examiner

Primary Examiner—Justine R. Yu
Assistant Examiner—John F. Belena
(74) Attorney, Agent, or Firm—Francis L. Conte

(57) ABSTRACT

A center plug is configured for variable area use in an exhaust nozzle. A forward portion of the plug includes an inlet having a closing flap therein, and an aft portion of the plug includes an outlet. The flap is selectively open during aircraft takeoff operation and up to a preset climb altitude for bypassing a portion of core exhaust flow through the plug, with the flap being closed from preset altitude and cruise operation. Opening the flap correspondingly increases the available flow area for discharging the exhaust flow for reducing velocity thereof, and attenuating noise.

20 Claims, 3 Drawing Sheets

VARIABLE AREA PLUG NOZZLE

This application claims the benefit of U.S. Provisional Application No. 60/346,949; filed Jan. 9, 2002.

BACKGROUND OF THE INVENTION

The present invention relates generally to turbofan aircraft gas turbine engines, and, more specifically, to noise attenuation therein.

In an aircraft turbofan engine, air is pressurized in a compressor and mixed with fuel in a combustor for generating hot combustion gases which flow downstream through turbine stages that extract energy therefrom. A high pressure turbine powers the compressor, and a low pressure turbine powers a fan disposed upstream of the compressor.

The combustion gases are discharged from the core engine through an annular exhaust nozzle, and the fan air is discharged through another exhaust nozzle surrounding the core engine. The majority of propulsion thrust is provided by the pressurized fan air discharged from the fan exhaust nozzle, and remaining thrust is provided from the combustion gases discharged from the core exhaust nozzle.

The core exhaust flow is discharged from the core nozzle at high velocity and then mixes with the fan air discharged from the fan nozzle as well as with ambient air through which the engine and aircraft travel. The high velocity exhaust flow generates significant noise during operation, with additional noise being generated by the fan exhaust, as well as by the rotating components of the engine.

Turbofan aircraft engines have various designs including low bypass, high bypass, and long or short duct nacelles. And, these various designs may include various features for attenuating noise corresponding with the specific noise source. However, noise attenuation features typically add weight to the engine, and it is desirable to minimize engine weight in an aircraft turbofan engine.

Accordingly, it is desired to provide an aircraft turbofan engine with an improved exhaust nozzle for attenuating noise during takeoff operation.

BRIEF SUMMARY OF THE INVENTION

A center plug is configured for variable area use in an exhaust nozzle. A forward portion of the plug includes an inlet having a closing flap therein, and an aft portion of the plug includes an outlet. The flap is selectively open during aircraft takeoff operation for bypassing a portion of core exhaust flow through the plug, with the flap being closed at cruise operation. Opening the flap correspondingly increases the available flow area for discharging the exhaust flow for reducing velocity thereof, and attenuating noise.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
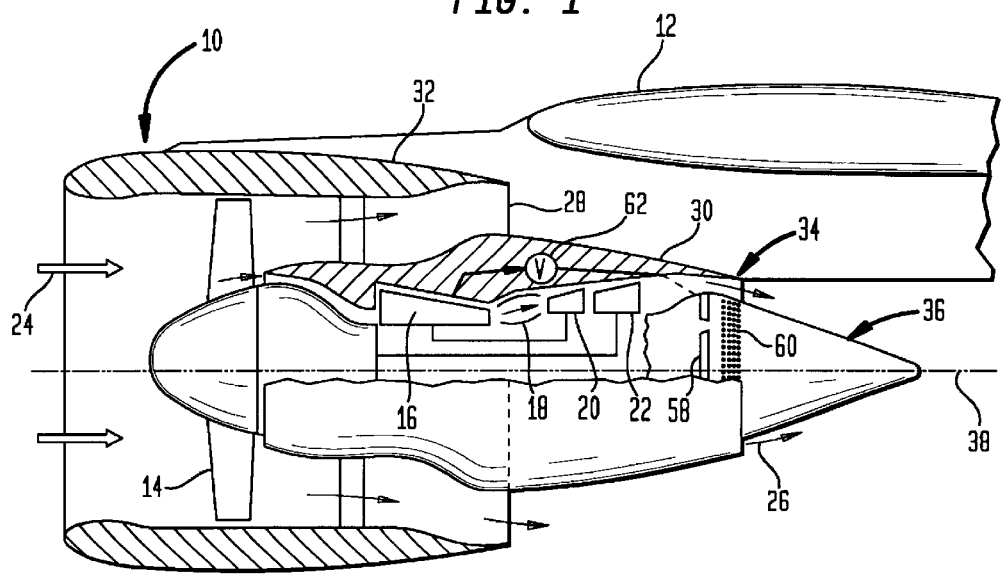
FIG. 1 is a partly sectional axial view of an exemplary turbofan aircraft gas turbine engine mounted by a pylon to the wing of an aircraft, and including a variable area plug nozzle in accordance with one embodiment of the present invention.

Illustrated in FIG. 1 is an exemplary turbofan aircraft gas turbine engine 10 mounted by a pylon to the wing of an aircraft 12, shown in part. The engine includes in serial flow communication a fan 14, multistage axial compressor 16, annular combustor 18, high pressure turbine 20, and low pressure turbine 22.

During operation, air 24 is pressurized in the compressor and mixed with fuel in the combustor for generating hot combustion gases 26 which flow through the high and low pressure turbines that extract energy therefrom. The high pressure turbine powers the compressor through a shaft therebetween, and the low pressure turbine powers the fan through another shaft therebetween.

The exemplary turbofan engine illustrated in FIG. 1 is in the form of a high bypass ratio engine in which most of the air pressurized by the fan bypasses the core engine itself for generating propulsion thrust. The fan air 24 is discharged from the engine through a substantially annular fan exhaust nozzle 28 defined radially between an outer shell or nacelle 30 of the core engine and a fan nacelle 32 surrounding the fan and the forward portion of the core engine.

The core exhaust gases 26 are discharged from the core engine through an annular core exhaust nozzle 34 defined between the core nacelle 30 and a center plug 36 disposed coaxially or concentrically therein around an axial centerline axis 38 of the engine and plug.

In the exemplary embodiment illustrated in FIG. 1, the core nacelle 30 extends aft from the fan nozzle 28, and the center plug 36 extends in aft part downstream from the core nozzle 34 and in forward part upstream inside the core nozzle. This turbofan engine is conventional in configuration and operation, but includes an improved core exhaust nozzle 34 in accordance with the present invention as described hereinbelow. During conventional operation, the engine is operated at high power and thrust during takeoff of the aircraft, and at a preferred altitude the power and thrust of the engine are cut back to lower levels for efficiently propelling the aircraft during cruise operation.

Both the fan nozzle and core nozzle are specifically designed to provide sufficient flow area for discharging the increased level of fan air and core flow during takeoff operation, with reduced levels at cruise. As indicated above, the high velocity of these exhaust flows generate corresponding forms of noise during aircraft operation.

In accordance with the present invention, variable area capability of the core exhaust nozzle 34 illustrated in FIG. 1 is introduced by modification of the center plug 36. The core nozzle 34 is illustrated in more detail in FIG. 2 in accordance with a preferred embodiment in which the center plug 36 is disposed coaxially inside the outer cowling or core nacelle 30 to define an annular core exhaust channel or duct 40 radially therebetween.

The core nacelle 30 includes outer and inner skins terminating at a trailing edge 42 surrounding the plug 36 to define a discharge flow area specifically determined for the particular specifications of the turbofan engine in a conventional manner.

The exhaust plug 36 is suitably mounted to the aft end of the core engine, and includes an annular outer skin 44 having an annular bypass portion or band 46. The bypass band 46 may include an annular bulge or hump of maximum outer diameter in the exemplary embodiment illustrated, or may simply converge aft in alternate embodiments. The hump is disposed inside the exhaust duct 40, with the outer skin having a portion extending forward from the hump, which is in turn disposed forward from the nacelle trailing edge 42, to define an annular duct inlet 48 which receives the combustion exhaust gases 26 from the low pressure turbine during operation.

The outer skin also includes a conical portion converging aft from the hump which further extends aft from the nacelle trailing edge 42 to define an annular duct outlet 50 through which the exhaust gases are discharged from the core nacelle. The duct outlet surrounds an intermediate portion of the conical center plug and has a fixed flow area measured in the axial plane located at the nacelle trailing edge 42.

Figure 2:
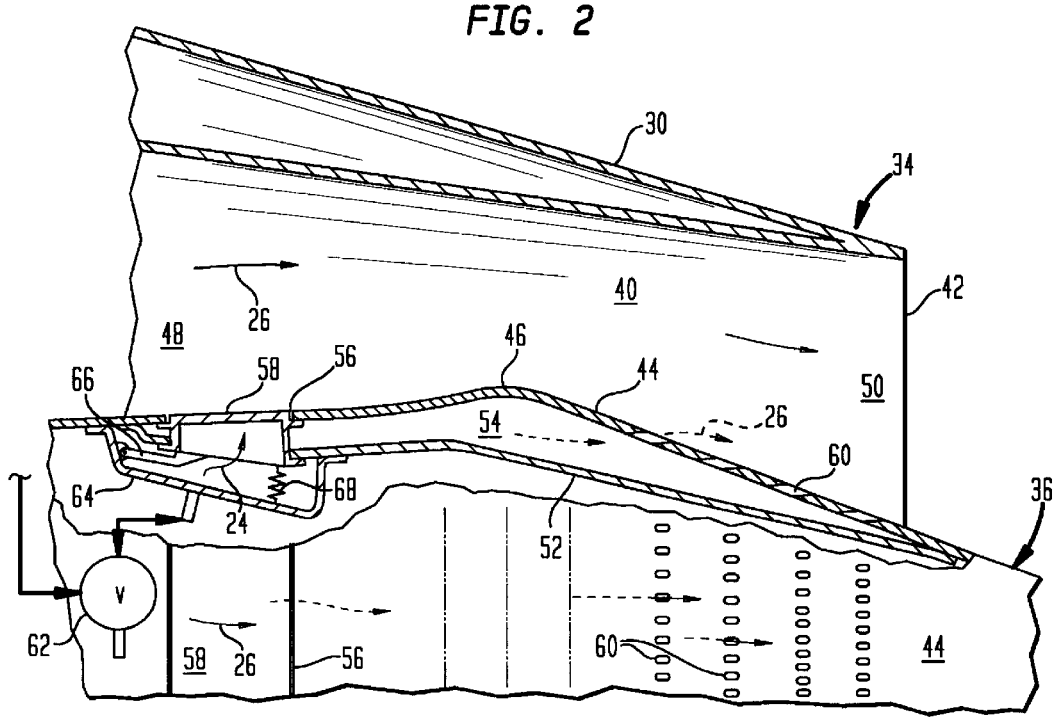
FIG. 2 is an enlarged axial sectional view of a portion of the plug nozzle illustrated in FIG. 1.

In accordance with a preferred embodiment of the present invention, the exhaust plug 36 also includes an annular inner skin 52 as shown in FIG. 2 disposed coaxially or concentrically inside the bypass band 46 of the outer skin 44 to define an internal annular bypass duct 54 radially therebetween.

The exhaust plug 36 also includes an inlet 56 disposed in the outer skin adjacent the duct inlet 48 in flow communication with the bypass duct 54. A flap or door 58 is disposed inside the plug inlet for maintaining closed the plug inlet 56 when desired. And, the plug also includes an outlet 60 in the outer skin adjacent the duct outlet 50, with the outlet 60 being disposed in flow communication with the bypass duct. The trailing edge 42 of the core duct outlet may be located downstream, upstream, or in between of the plug outlet 60.

Figure 3:
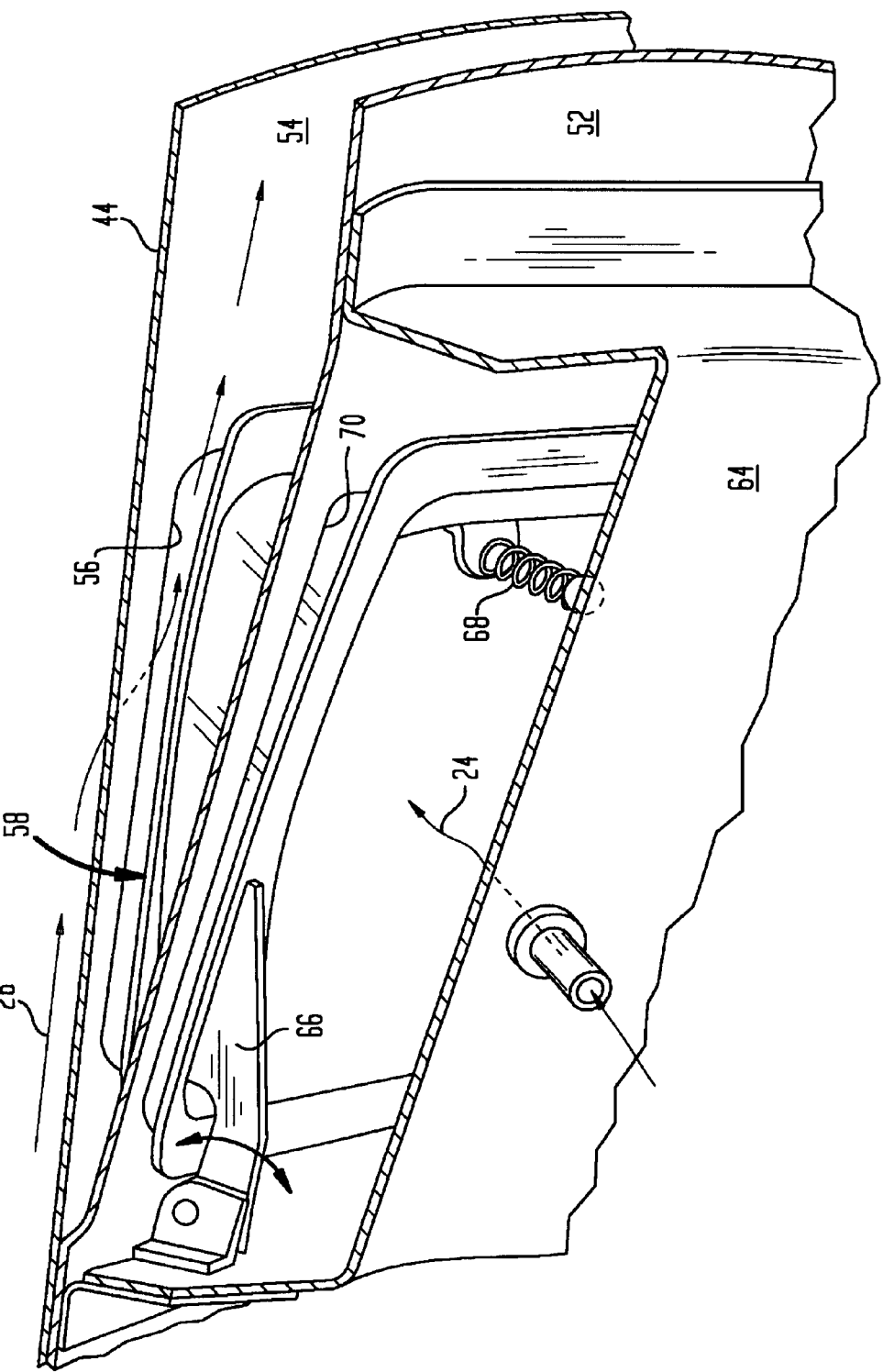
FIG. 3 is an isometric view of an exemplary plug inlet and closing flap used in the nozzle illustrated in FIG. 2.

Suitable means 62 are provided for selectively moving the flap 58 between its closed position illustrated in FIG. 2 blocking and sealing closed the plug inlet 56, and to an open position, illustrated in part in FIG. 3, for unblocking the plug inlet 56 for receiving a portion of the exhaust flow 26. By selectively opening the flap 58 a portion of the core exhaust flow 26 may be bypassed from the exhaust duct 40 upstream from the bypass band 46 and through the bypass duct 54 through the exhaust plug for discharge through the plug outlet 60 near the duct outlet.

In this way, the exhaust plug provides a local increase in flow area inside the exhaust duct that leads to an increase of core mass flow to correspondingly reduce the velocity of the exhaust flow, which in turn reduces noise therefrom. The introduction of the movable flap 58 and plug outlet 60 provides variable area capability for the core exhaust nozzle 34 in a relatively simple and efficient manner.

As shown in FIG. 2, the bypass band 46 is disposed axially inside the exhaust duct 40 between the plug inlet 56 and plug outlet 60. A conventional center plug is typically imperforate, and the flow area within the exhaust duct 40, as well as the flow area of the duct outlet 50, remain fixed as the combustion gases are discharged therethrough. However, by introducing the plug inlet and outlet and controlling inlet flap 58, a local increase in flow area downstream of the bypass band may be provided by the plug outlet 60 when the inlet flap 58 is open for bypassing a portion of the exhaust flow therethrough.

In the preferred embodiment illustrated in FIGS. 1 and 2, the forward portion of the outer skin 44 preferably includes a circumferential row of the inlet apertures 56 spaced apart from each other for collectively defining the plug inlet, with each of the inlet apertures 56 being selectively closed by a respective one of the plug flaps 58. The size and configuration of the plug inlet apertures 56 and the size and configuration of the plug outlet 60 are suitably selected for the specific amount of flow area increase desired, which may be up to about 20 percent, or more, of the total flow area of the duct outlet 50 at the trailing edge 42. The multiple inlet apertures 56 may collectively feed the common annular bypass duct 54 for bypassing the plug hump 46 to discharge the bypassed exhaust flow through the plug outlet 60 in the converging portion of the outer skin disposed downstream from the hump 46.

As shown in FIGS. 2 and 3, the exhaust plug 36 preferably also includes an annular manifold 64 which encloses the several plug flaps 58 at the respective inlet apertures 56. The manifold 64 defines a sealed chamber around the flaps and inlet apertures for sealingly joining the inlet apertures to the bypass duct 54. In this way, the flaps can be opened into the common manifold 64 for permitting the exhaust flow to enter the common bypass duct 54 through the several inlet apertures 56. The bypass flow is therefore confined to flow through the bypass duct 54 without leakage into the remainder of the exhaust plug.

Figure 4:
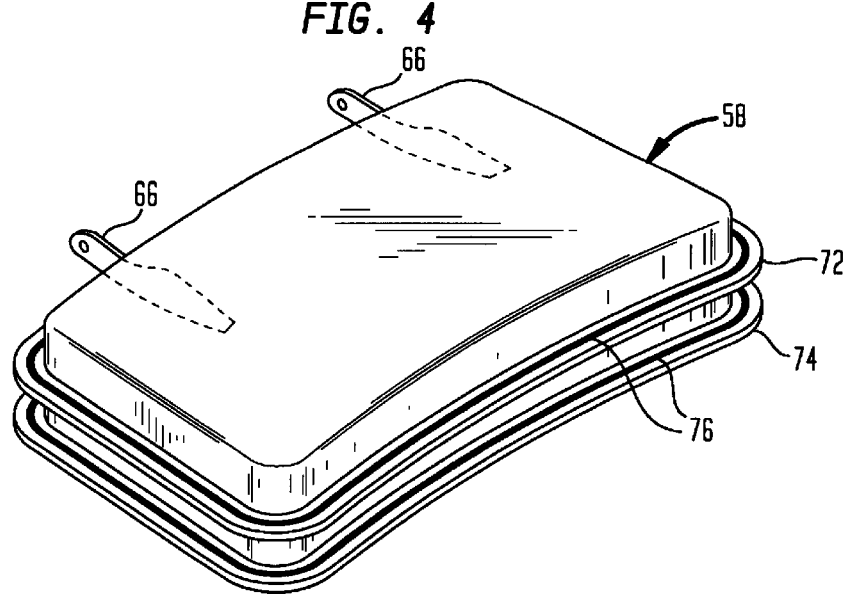
FIG. 4 is an isometric view of the plug flap illustrated in FIG. 3 in isolation.

As shown in FIGS. 2–4, each of the flaps 58 is preferably pivotally mounted inside the exhaust plug by a corresponding pair of hinges 66 at upstream ends of the flaps. For example, the hinges 66 may mount the flaps to an upstream wall of the enclosing manifold 64 for permitting retraction of the flaps into the manifold when desired.

The flap moving means 62 may have any suitable configuration for opening and closing the several plug flaps 58. In the preferred embodiment illustrated in FIGS. 1 and 2, the flap moving means include a bleed conduit extending from the manifold 64 to join in flow communication the compressor 16 of the engine, with a valve being operatively disposed in the bleed conduit for selectively pressurizing the manifold with compressor bleed air when desired, and for alternatively venting the bleed air from the manifold.

In this configuration, the bleed valve may be suitably operated for pressurizing the manifold 64 with bleed air from the compressor to pressure-close the flaps 58 into the respective plug inlet apertures 56. Sufficient bleed air pressure may be maintained inside the manifold 64 to oppose the pressure of the exhaust flow 26 in the duct inlet 48 acting atop the exposed surfaces of the plug flaps 58.

Correspondingly, by operating the bleed valve to vent the manifold 64 of the pressurized bleed air therein, the pressure of the exhaust flow 26 inside the exhaust duct 40 may be effectively used to push open the plug flaps 58 radially inwardly into the vented manifold 64.

In this way, the flap moving means 62 may be configured for permitting differential pressure between the exhaust duct 40 and the manifold 64 to selectively close or open the plug flaps in their respective inlet apertures. Pressurizing the manifold provides a convenient manner to maintain closed the plug flaps. And, venting the manifold provides a convenient manner for permitting exhaust gas pressure in the exhaust duct to self-open the plug flaps and bypass a portion of the exhaust flow through the plug and out the plug outlets 60 for temporary increase in outlet flow area.

As shown in FIGS. 2 and 3, the flap moving means preferably also include one or more return springs 68 for each plug flap disposed inside the common manifold 64. Each spring 68 extends between each flap and the manifold for biasing closed each of the flaps using the force generated by compression of the spring. The springs are therefore used to supplement the closing force on each flap in addition to the closing force provided by the bleed air 24 selectively channeled into the manifold.

In the preferred embodiment the return springs 68 are sized to produce a closing force on each flap which is sufficient to retain closed each flap in its inlet aperture against exhaust gas pressure in the exhaust duct 40 occurring at preset climb altitude and aircraft cruise operation, notwithstanding venting of pressure in the manifold 64. During cruise operation of the engine, the pressure of the exhaust flow in the exhaust duct 40 is substantially reduced over the pressure therein during takeoff operation of the engine.

By introducing the return spring 68 in the manifold 64, the spring force therefrom may be solely used to keep closed the plug flaps during cruise operation, and eliminate the need during cruise for valuable bleed air from the compressor. Bleeding air from the compressor correspondingly reduces the efficiency of the engine. The springs may therefore be used instead of bleed air at cruise operation for maximizing engine efficiency during cruise.

In the preferred embodiment illustrated in FIG. 3, the inner skin 52 includes a row of manifold apertures 70 aligned radially with respective ones of the inlet apertures 56. The inner skin is sealingly joined to the outer skin forward of the inlet apertures 56 to provide a flow boundary for the bypass duct 54.

Correspondingly, the common manifold 64 is sealingly joined to the inner skin 52 downstream of the manifold apertures 70 and sealingly joined to the inner skin at its junction with the outer skin forward of the inlet apertures 56. The individual flaps 58 may then be configured to extend radially through the manifold apertures 70 to close the inlet apertures 56. This configuration offers substantial advantage.

More specifically, each of the flaps 58 as illustrated in FIGS. 3 and 4 preferably has a hollow box construction including a radially outer perimeter flange 72 recessed radially inwardly from the radially outer surface of the flap and extending laterally outwardly therefrom for overlapping the entire perimeter of the corresponding inlet aperture 56 as shown in FIG. 3 for providing a seal therewith when closed.

Furthermore, each flap 58 preferably has a radially inner perimeter flange 74 extending laterally outwardly from the box wall thereof to overlap the perimeter of the manifold aperture 70 for proving a corresponding seal therewith when the flap is closed.

In this way, when each flap 58 is closed as illustrated in FIG. 2, the corresponding outer and inner flanges thereof overlap the respective inlet aperture 56 and manifold aperture 70 for providing seals therewith. The top surface of each flap is preferably flush with the outer surface of the outer skin for smoothly bounding the exhaust flow through the exhaust duct 40 without leakage through the inlet apertures into the bypass duct.

Since the flaps are preferably pressure-closed using bleed air channeled into the common manifold 64, the flap inner flange forms a corresponding seal around the manifold aperture for sealing closed the manifold to prevent escape of the pressurized bleed air into the bypass duct 54 when the flaps are closed.

As shown in FIG. 4, each flap may include a suitable metal seal 76 affixed to the perimeters of the outer and inner flanges 72,74 for improving the corresponding seals with the inner surfaces of the outer and inner skins around the respective apertures 56,70. The seals 76 ensure leak-free closing of the flaps 58 for maintaining efficient operation of the engine when the flaps are closed. And, when the flaps are opened a portion of the exhaust flow is diverted through the bypass duct 54 in the plug for discharge solely through the plug outlet 60, with the manifold 64 sealingly containing the plug flaps 58.

In the exemplary embodiment illustrated in FIG. 2, the plug outlet 60 is disposed forward of the duct outlet 50 and the trailing edge 42, and downstream of the bypass band 46. In another embodiment, the plug outlet 60 may be disposed downstream of the duct outlet 50 and the trailing edge 42. Yet in another embodiment, the plug outlet 60 may be disposed in between the duct outlet 50 and the trailing edge 42.

Since the plug inlet apertures 56 are closed by the flaps 58, the plug outlet 60 may remain always open without obstruction, and therefore requires no separate valving thereof. Since the bypass duct and manifold are sealed during operation, back flow of the exhaust gases through the plug outlet is restrained when the plug flaps 58 are closed. When the flaps are opened, the differential pressure of the exhaust flow in the downstream direction drives the exhaust gases from the plug inlet through the bypass duct to the plug outlet.

The plug outlet 60 is illustrated in FIG. 2 in the preferred form of several rows of small outlet apertures extending through the outer skin. Each of the plug outlet apertures 60 may have a nominal diameter of a few millimeters, or other suitable size, with a sufficient number of apertures being provided for collectively meeting the desired increase in discharge flow area, up to about 20 percent of the discharge flow area of the duct outlet 50, or greater, as desired.

The plug outlet apertures 60 preferably extend parallel to the centerline axis of the plug, and have elliptical profiles exposed on the plug outer skin. In this way, the outer skin maintains an aerodynamically smooth inner boundary surface for the exhaust flow being discharged through the exhaust duct 40.

Figure 5:
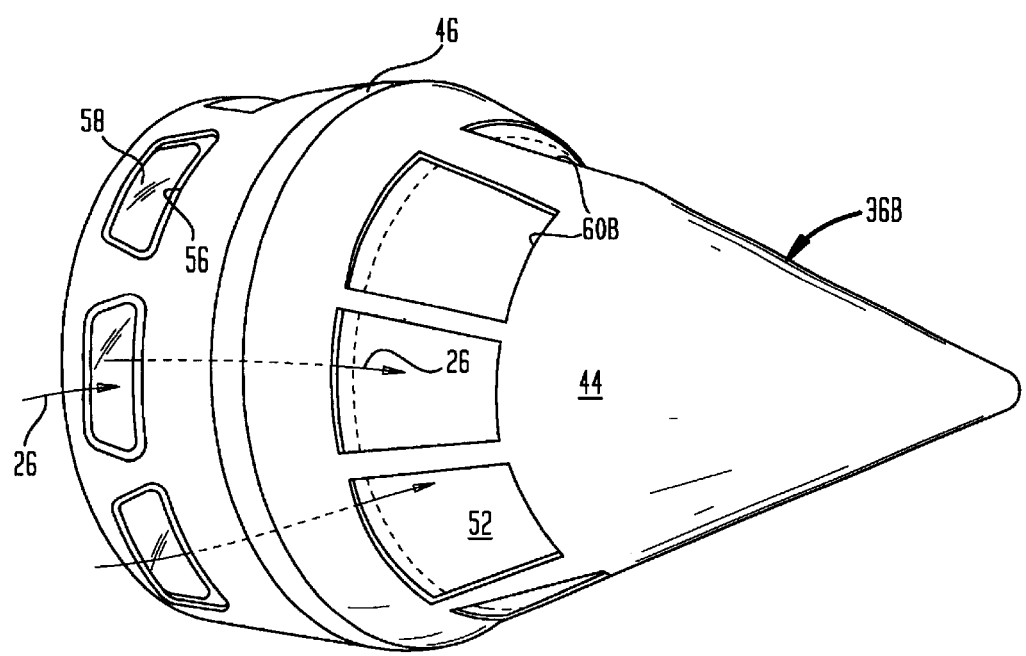
FIG. 5 is an isometric view of the center plug of FIG. 1 in accordance with an alternate embodiment of the invention.

FIG. 5 illustrates an alternate embodiment of the exhaust plug illustrated in FIG. 1, and designated 36B. The exhaust plug 36B may be identical to the exhaust plug 36 described above except that the plug outlet aperture is in the form of one or more arcuate windows or cut-outs 60B which extend aft of the nozzle trailing edge 42. Each window 60B has a flow area larger than one of the inlet apertures 56, with the collective area of the outlet windows 60B being generally larger than the collective flow area of the several inlet apertures 56. The number and size of the plug outlet windows 60B may be determined for collectively meeting the desired increase in discharge core flow area.

The plug outlet in the outer skin of the center plug may have other configurations for providing a local increase in discharge area near the outlet of the core exhaust duct, either forward thereof, aft thereof, or both.

Since the center plug 36 defines the inner boundary of the core exhaust nozzle, it may be suitably configured for providing variable area capability thereof. In particular, core exhaust noise may be reduced or attenuated by selectively bypassing a portion of the exhaust gas flow through the center plug during takeoff operation of the nozzle in an aircraft. And, exhaust flow bypassing through the center plug may be terminated at a preset altitude during climb operation of the nozzle in the aircraft when noise attenuation is no longer required, yet maximum efficiency of the engine is desired. The center plug provides a convenient location for introducing variable area capability using the plug inlet and outlet, and the cooperating flow controlling flap.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. An exhaust nozzle comprising:
    an outer shell having a trailing edge;
    a plug disposed coaxially inside said shell for defining an annular exhaust duct therebetween, and extending forward from said shell trailing edge to define an annular duct inlet for receiving exhaust gases, and extending aft from said trailing edge to define an annular duct outlet therebetween for discharging said exhaust gases;
    said plug including an inlet adjacent said duct inlet, a flap closing said plug inlet, and an outlet adjacent said duct outlet; and
    means for selectively moving said flap to bypass a portion of said exhaust gases from said exhaust duct and through said plug to said plug outlet for discharge near said duct outlet.

2. A nozzle according to claim 1 wherein said plug includes an annular bypass band disposed in said exhaust duct axially between said plug inlet and plug outlet, and said plug outlet provides a local increase in flow area downstream of said band when said inlet flap is open.

3. A nozzle according to claim 2 wherein said plug further comprises:
    a radially outer skin including a portion forward of said band having a row of apertures defining said plug inlet and selectively closed by respective ones of said flaps, and including a portion converging aft from said band and having said plug outlet therein; and
    an inner skin spaced radially inwardly from said outer skin to define a bypass duct therebetween disposed in flow communication with said inlet apertures and plug outlet.

4. A nozzle according to claim 3 wherein said plug further comprises an annular manifold sealingly enclosing said flaps at said inlet apertures.

5. A nozzle according to claim 4 wherein:
    said flaps are pivotally mounted inside said plug; and
    said flap moving means are configured for permitting pressure of said exhaust gases flowable in said exhaust duct to pivot said flaps radially inwardly into said manifold for flow through said bypass duct and out said plug outlet.

6. A nozzle according to claim 5 wherein said moving means are configured for pressurizing said manifold to pressurize closed said flaps against said exhaust gas pressure inside said exhaust duct, and venting said manifold to permit said exhaust gas to open said flaps.

7. A nozzle according to claim 6 wherein said flap moving means comprise a respective return spring disposed in said manifold for biasing closed each of said flaps.

8. A nozzle according to claim 7 wherein said return spring is sized to produce a closing force on said flap sufficient to retain closed said flap against exhaust gas pressure in said exhaust duct occurring at aircraft cruise operation notwithstanding venting of said pressure in said manifold.

9. A nozzle according to claim 6 wherein said flap moving means further comprise a bleed conduit extending from said manifold to join in flow communication a compressor of a gas turbine engine, and a valve operatively disposed in said bleed conduit for selectively pressurizing said manifold with compressor bleed air, and venting said bleed air therefrom.

10. A nozzle according to claim 6 wherein:
    said inner skin includes a row of manifold apertures aligned with respective ones of said inlet apertures; and
    said flaps extend through said manifold apertures to close said inlet apertures.

11. A nozzle according to claim 10 wherein each of said flaps includes a radially outer perimeter flange sized to overlap said inlet aperture for provide a seal therewith, and a radially inner perimeter flange sized to overlap said manifold aperture for providing a seal therewith.

12. A nozzle according to claim 6 wherein said plug outlet is disposed forward of said duct outlet.

13. A nozzle according to claim 6 wherein said plug outlet is open.

14. A nozzle according to claim 6 wherein said plug outlet comprises annular rows of outlet apertures.

15. A nozzle according to claim 14 wherein said outlet apertures extend parallel to the centerline axis of said plug, and have elliptical profiles exposed on said outer skin.

16. A nozzle according to claim 6 wherein said plug outlet comprises an arcuate cut-out in said outer skin being larger in flow area than one of said inlet apertures.

17. An exhaust plug comprising:
    an annular outer skin including an annular hump, a portion extending forward therefrom, and a portion converging aft from said hump;
    an annular inner skin disposed concentrically inside said outer skin to define an annular bypass duct radially therebetween;
    a row of plug inlet apertures disposed in said forward portion of said outer skin in flow communication with said bypass duct;
    a plug outlet disposed in said aft portion of said outer skin in flow communication with said bypass duct;
    a plurality of flaps, each disposed in a respective one of said inlet apertures; and
    means for selectively moving said flaps between closed and open positions for selectively bypassing exhaust gases through said bypass duct around said hump.

18. An exhaust plug according to claim 17 further comprising:
    an annular manifold sealingly enclosing said flaps at said inlet apertures;
    said flaps being pivotally mounted inside said plug manifold by pairs of hinges; and
    said flap moving means are configured to selectively pressurize said manifold to pressure-close said flaps, and selectively vent said manifold to permit said flaps to open into said manifold.

19. An exhaust plug according to claim 18 wherein:
    said inner skin includes a row of manifold apertures aligned with respective ones of said inlet apertures;
    said flaps extend through said manifold apertures to close said inlet apertures; and
    each of said flaps includes a radially outer perimeter flange sized to overlap said inlet aperture for providing a seal therewith, and a radially inner perimeter flange sized to overlap said manifold aperture for providing a seal therewith.

20. A method of attenuating noise in an aircraft gas turbine engine exhaust nozzle having a center plug, comprising:

discharging hot exhaust gas flow from a turbine into said exhaust nozzle;

bypassing a portion of said exhaust gas flow from said exhaust nozzle through said center plug during takeoff operation of said nozzle in an aircraft for temporarily increasing outlet flow area of said nozzle; and terminating exhaust gas bypassing through said center plug during cruise operation of said nozzle in said aircraft.

\* \* \* \* \*